United States Patent Office.

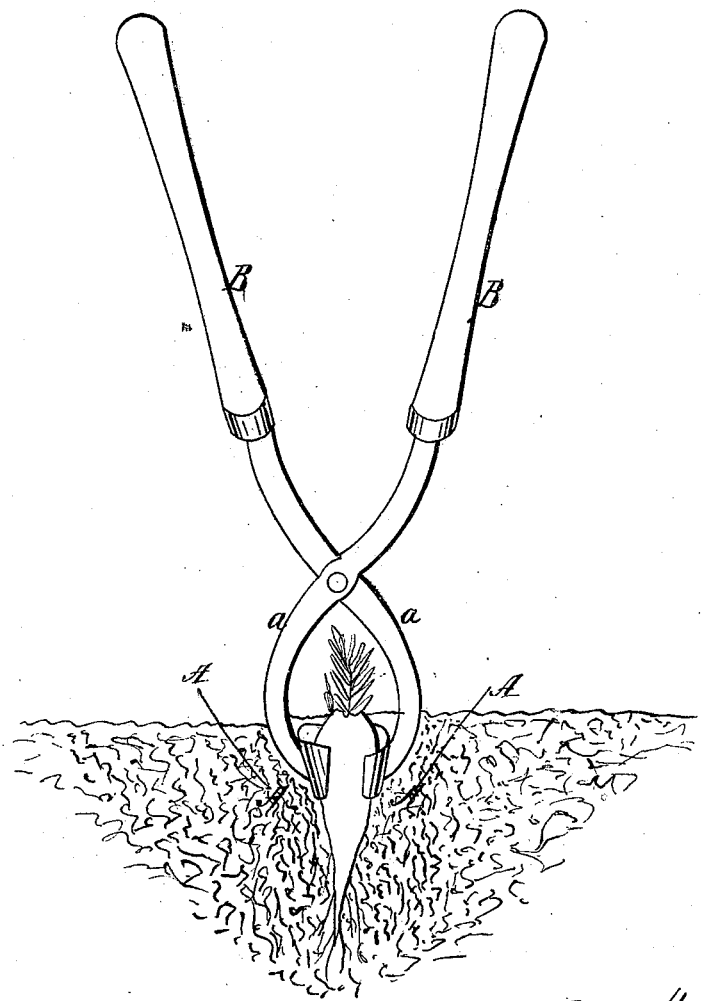

BAXTER WRIGHT, OF CARDIFF, NEW YORK.

Letters Patent No. 89,615, dated May 4, 1869.

IMPROVEMENT IN ROOT-DIGGER.

The Schedule referred to in these Letters Patent and making part of the same.

*To all whom it may concern:*

Be it known that I, BAXTER WRIGHT, of Cardiff, in the county of Onondaga, and State of New York, have invented a new and improved Root-Digger; and I do hereby declare that the following is a full, clear, and exact description thereof, which will enable those skilled in the art to make and use the same, reference being had to the accompanying drawings, forming a part of this specification.

This invention consists in a pair of small curved spades, having handles, which are pivoted to each other, so as to be capable of grasping the vegetables, for drawing them out of the ground, as hereinafter more fully described.

In the accompanying drawings—

A A are small spades, which are cast of malleable iron, with shanks *a a*, said shanks being pivoted together, as shown, and terminating in wooden handles, B B.

The spades are formed so as to be pushed into the ground easily; and their inner faces are made concave, to embrace the sides of the vegetable.

The spades are inserted in the earth, on opposite sides of the root or vegetable, and the handles B are then pressed together slightly, to clamp the spades upon the root, and it is then drawn or lifted out.

The root is not bruised by the spades, as there is always more or less earth between them and the root, which distributes the clamping-pressure evenly on its sides, where it is seized by the spades.

By this means, the longest roots or vegetables are drawn easily and rapidly.

Having thus described my invention,

What I claim as new, and desire to secure by Letters Patent, is—

So constructing and arranging the blades, by placing them at an inward angle, as that they will follow the root to be extracted, and prevent the drawing up of earth, substantially as described.

The above specification of my invention signed by me, this 26th day of February, 1869.

BAXTER WRIGHT.

Witnesses:
C. E. WARNER,
F. A. MORLEY.